Dec. 17, 1957         G. T. GIBSON         2,816,671
REFUSE-COLLECTING VEHICLES
Filed July 23, 1956         4 Sheets-Sheet 1
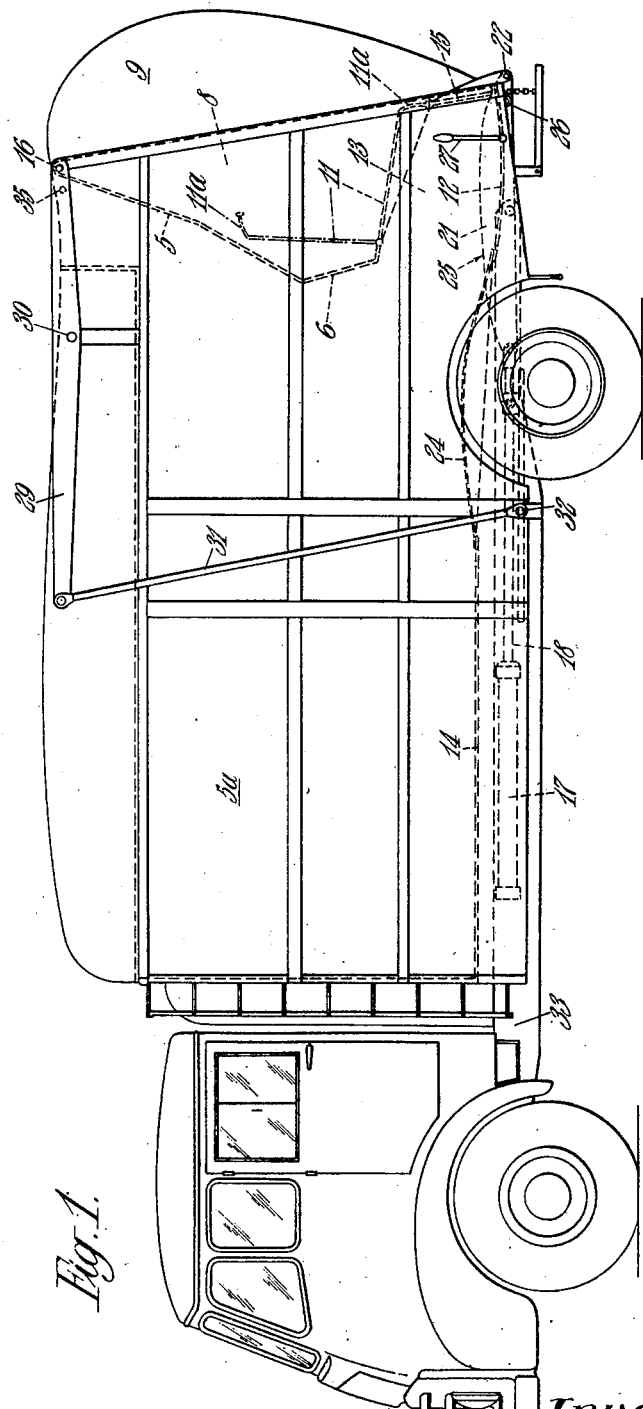
Inventor
G. T. Gibson Dec. 17, 1957  G. T. GIBSON  2,816,671
REFUSE-COLLECTING VEHICLES
Filed July 23, 1956  4 Sheets-Sheet 2
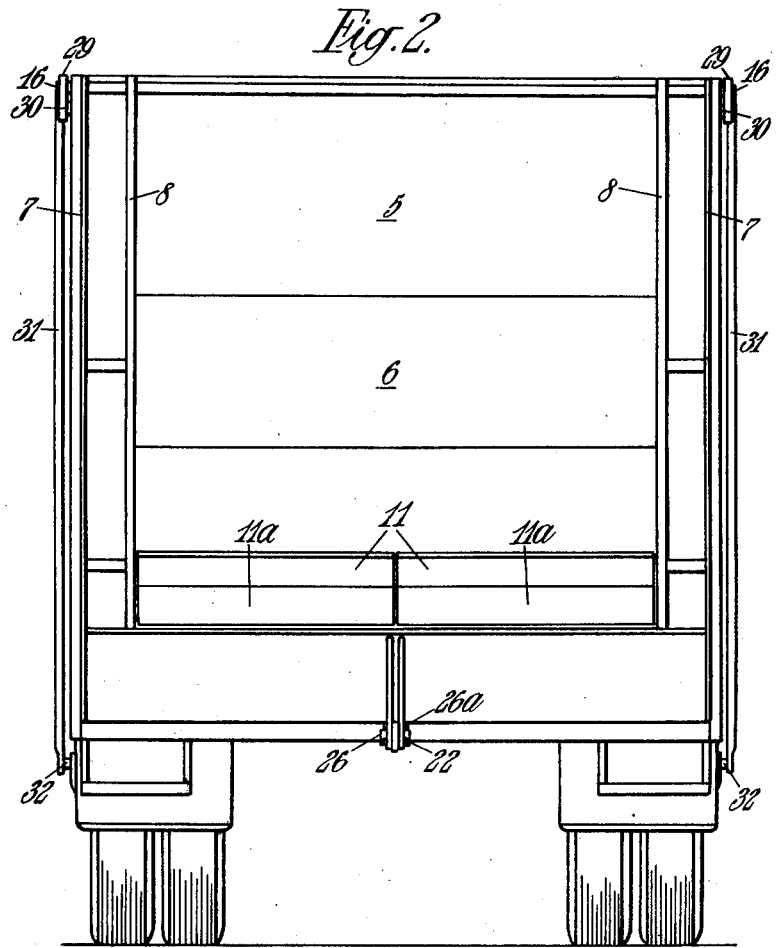
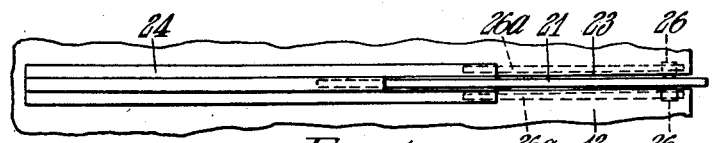
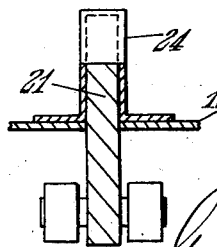
Inventor
G. T. Gibson

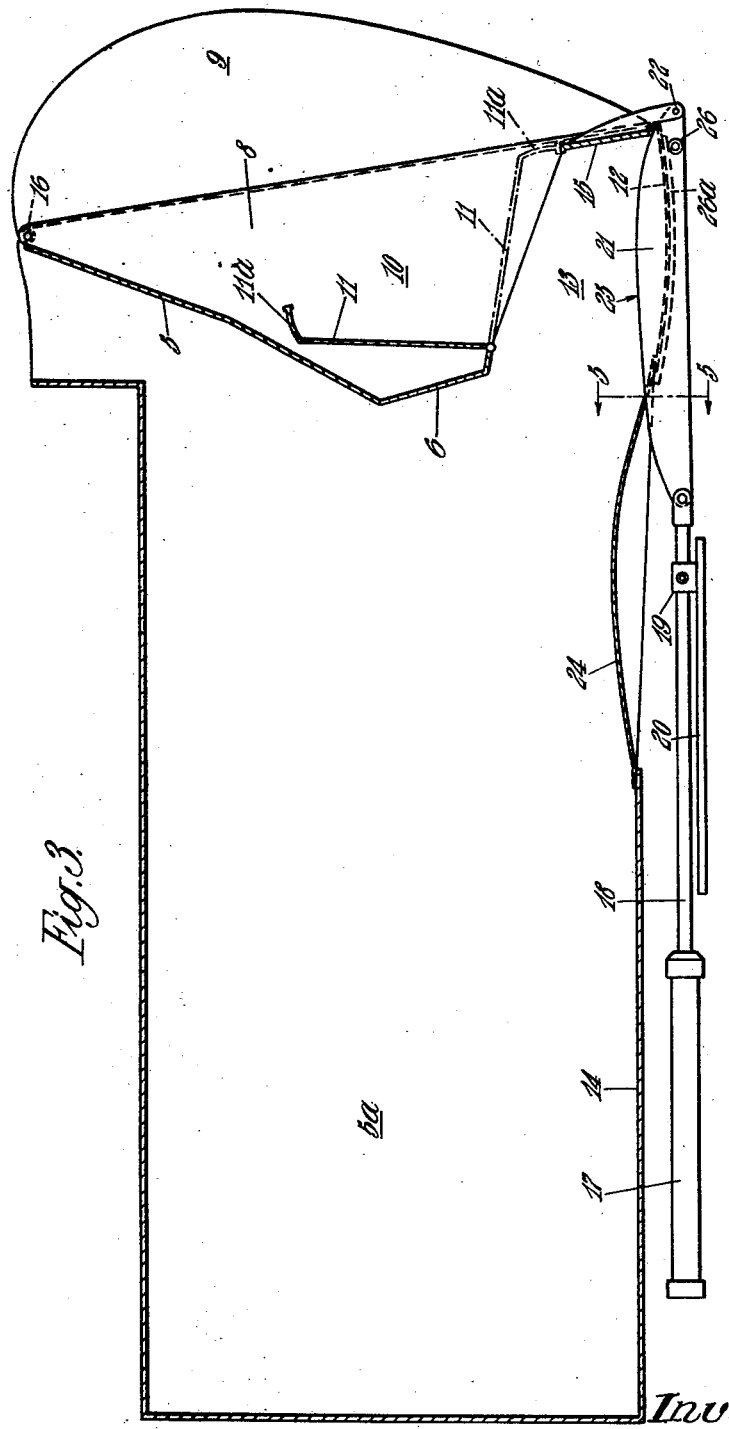

Dec. 17, 1957  G. T. GIBSON  2,816,671
REFUSE-COLLECTING VEHICLES
Filed July 23, 1956  4 Sheets-Sheet 4

Inventor
G. T. Gibson

United States Patent Office 2,816,671
Patented Dec. 17, 1957

2,816,671

REFUSE-COLLECTING VEHICLES

George Thomson Gibson, Leith, Edinburgh, Scotland, assignor to John Gibson & Son, Limited, Leith, Edinburgh, Scotland Application July 23, 1956, Serial No. 599,661

Claims priority, application Great Britain September 12, 1955

1 Claim. (Cl. 214—83.3)

This invention has reference to refuse-collecting vehicles in which the vehicle body is provided with a pendulously supported rear door normally closing the rear of the body and which body is adapted to be tipped to discharge the refuse through the door opening. The invention relates particularly to such vehicles of the type in which the floor thereof terminates at its rear end in an arcuate section curved downwards and outwards and the door structure is provided with a substantially horizontal charging opening spaced above said arcuate floor section so as to form a charging space for the refuse, a transverse pushed plate forming the rear of the charging space, and an upwardly transversely extending wall at the front of said charging opening, a hydraulic or other fluid operated cylinder and ram assembly being provided to swing the door inwardly so that the refuse delivered into the charging chamber is forced upwards thereby towards the forward end of the vehicle body.

In refuse-collecting vehicles of this type as heretofore constructed the said cylinder and ram assembly is located within the vehicle body and extends along the floor thereof and in consequence it is in close contact with the refuse. It will be appreciated that contact of refuse with the moving parts of the door operating means is highly undesirable and the present invention has for its object to provide improvements whereby the door operating means will be adequately protected from contact with refuse and which will be so operatively connected to the door that the passage of refuse and dust through the floor will be effectively prevented.

According to the present invention in a refuse-collecting vehicle of the type set forth the cylinder and ram assembly is positioned below the floor of the body of the vehicle and the ram is connected to the door by means of a link of rectangular cross section with its major axis vertical, while the floor of the body of the vehicle, including the section of arcuate formation, is provided with a longitudinal slot and a cowling covering the forward end of the slot and open at its rear end, the link passing through and sealing said slot where it extends rearwardly of the cowling and sealing said opening, its upper edge being of a curvature, defined by the movement of the two ends thereof, such that in all positions of the link its upper edge is closely adjacent to the top of the cowling opening, the arrangement and construction being such that the cylinder and ram assembly is protected from contact with the refuse and the passage of refuse or dust through the floor of the vehicle is effectively prevented.

The invention will now be described with reference to the annexed drawings wherein:

Figure 1 is an elevation of a refuse-collecting vehicle in accordance with the invention;

Figure 2 is a rear view of the vehicle;

Figure 3 is a sectional elevation thereof but omitting the chassis;

Figure 4 is a plan view of part of the floor of the vehicle and the link;

Figure 5 is a section to a larger scale on the line 5—5 of Figure 3; and

Figure 6:
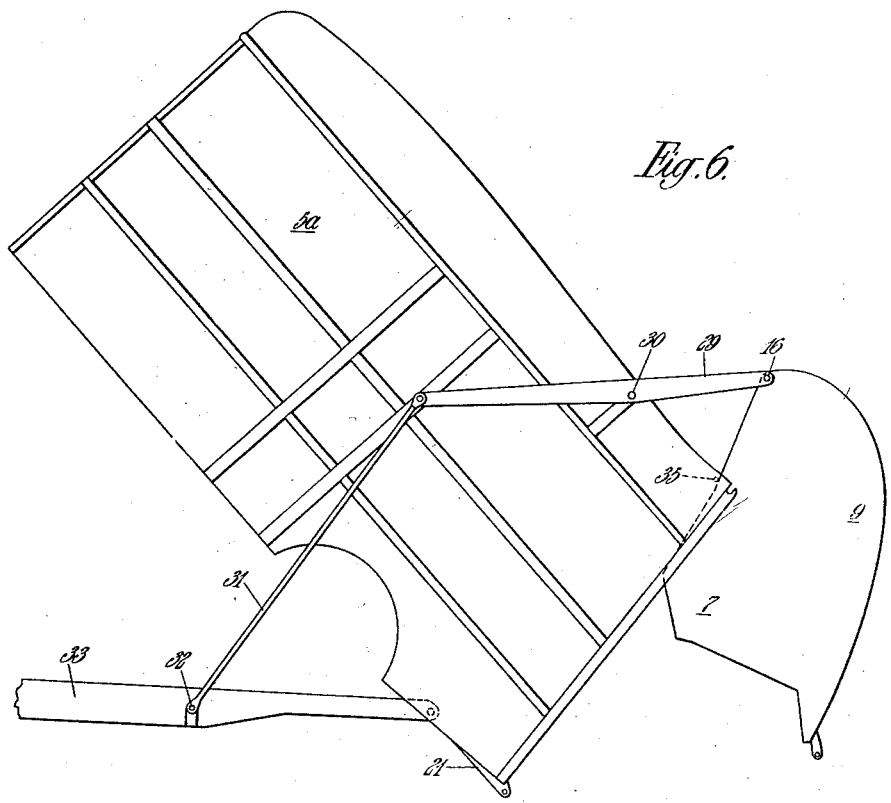
Figure 6 shows the body in a tipped position, part of the chassis and mechanism to turn the door outwards when the body is so tipped.

The refuse-collecting vehicle shown in the drawings is provided with a body 5a having rear door comprising oppositely inclined upper and lower wall sections 5 and 6 respectively extending between and connecting the inner or forward edges of a pair of spaced vertical outer side plates 7. The upper section is inclined forwardly and downwardly, that is towards the interior of the body and the lower section, when the door is in its closed position, is inclined rearwardly and downwardly. Each of the outer side plates is connected to and spaced from an inner vertical side plate 8, the space between each pair of side plates being braced to give the necessary rigidity to the structure. The outer sides plates are shaped to form rearwardly extending vertical side windscreens 9. The inner side plates 8 and wall sections together form a cavity 10 open at the rear and closed below by a platform composed of a pair of hinged lid sections 11. The platform constituted by the lid sections is spaced above the curved floor 12 of a charging chamber 13, the floor being curved upwards and merging into the main floor 14 of the vehicle body which has closed sides and a roof. The charging chamber 13 is open at the front thereof to the interior of the vehicle but it is closed at the rear by a depending barrier scraper or push plate 15 forming the lower part of the door. The door is pendulously supported in the rear of the vehicle body, it being hung by means of trunnions 16 in suitable bearings in the upper part of the vehicle so that the push plate can sweep over the curved section of the floor.

The refuse-collecting vehicle so far described is of known construction and is set forth in our prior British Patent 680,174.

Located below the floor and lying longitudinally thereof is a cylinder and ram assembly 17. The ram 18 is connected to a cross head 19 supported by a horizontal guide 20 and connected to the ram or to the cross head is one end of a link 21, the other end of which is adapted to be connected to the foot of the door by means of a locking pin 22 which may be withdrawn to permit movement of the door when the vehicle is being discharged.

The said link 21 is of rectangular cross section, its major axis being vertical. This link passes through a longitudinally extending slot 23 formed in the curved section 12 of the floor and also in the flat part of the floor adjacent thereto, the slot being of such width that the link which slides therein forms an effective seal thereto. Surmounting the slot where it extends forwardly from the curved section is a cowling 24 having an opening at the rear thereof of such section that the link, while being free to slide therein, forms therewith an effective seal. To ensure that the upper edge 25 of the link will always make sealing contact with the top of the opening in the cowling the said edge is not flat but is slightly curved as shown. The curvature is defined by the movement imparted to the two ends of the link when the door is pulled inwardly, its rear end moving to the arc swept by the foot of the door while its other end moves in a straight path. The link may be provided with rollers 26 cooperating with the underface of an arcuate guide 26a to prevent upward movement of the door.

In operating the apparatus the loading of the vehicle is effected while the door structure is locked to the body 5a by means of the said locking pin 22, the ram being also thus held against movement. The lid sections 11 are opened and the refuse is deposited into the charging chamber 13 until the latter is full. There is no possibility of any refuse or dust escaping through the slot in the floor or through the open end of the cowling as such slot and open end are effectively sealed by means of the aforesaid link. The lid sections 11 are then closed and locked in the closed position by means of hinged locking bars. It will be noted that the lids are provided with downwardly turned flanges 11a as clearly shown in Figure 1. When the lids are raised refuse can be tipped into the chamber 13 and allowed to heap up in the centre much higher than the top of the barrier scraper or push plate 15 and when the lids are closed the flanges prevent the refuse from spilling over the said scraper or push plates. Further said flanges increase the effective depth of the barrier or scraper or push plate 15. Thereafter the ram is operated to draw the push plate 15 forwards thus swinging the door inwards and sweeping the refuse along the curved floor into the interior of the vehicle. The flanges 11a assist in compressing the refuse. During this initial movement of the door structure the push plate pushes the refuse forwards. As the pile of refuse increases the lower wall section 6 of the door comes into operation and assists in pushing the upper part of the pile of material into the vehicle.

The supply of pressure fluid to the cylinder and ram assembly is controlled by a manually operable valve located at any convenient position. In the vehicle shown the valve is controlled by a manually operable lever 27 positioned at the side of and towards the rear of the body.

When the door is so operated the said slot, where it extends forwardly of the door, and the open end of the cowling always remain sealed by the link and this is also the case when the door is swung rearwardly to its initial position.

It desired rubber or like sealing strips may be provided along the edges of the slot and the said open end of the cowling.

The vehicle is unloaded in known manner. That is, the locking pin 22 connecting the door to the link is released and the vehicle tipped so that the front of the vehicle body rises while the door swings open. The door may swing open under its own weight or, if desired, this may be effected by means of link and lever mechanism in combination with guides.

Thus a lever 29 may be fulcrumed at 30 to each side of the body. One end of each lever is pivotally connected to a link 31, the lower ends of the two links being pivoted at 32 to outriggers from the chassis 33 of the vehicle. The other ends of the said levers carry the trunnions 16. As the body is tipped to discharge its contents the links 31 rock the levers 29 about their fulcrums thereby raising the door relative to the body, the door being simultaneously guided by a transverse bar 35 to assume the position shown in Figure 6.

What I claim is:

In a refuse-collecting vehicle in which the vehicle body is provided with a pendulously supported rear door and the floor of the body is formed with an arcuate section curved downwards and outwards and over which the foot of the door can sweep, means for operating the door to compress refuse deposited in the body comprising a cylinder and ram assembly located below the floor of the body, a link of rectangular cross section with its major axis vertical connecting the ram to the door, the floor, including the part of arcuate section, being provided with a slot to accommodate the link, and a cowling covering the forward end of the slot and open at its rear end through which the link passes, the upper edge of the link being of a curvature defined by the movement of the two ends thereof so that the link, in all its positions, seals the open end of the cowling.

References Cited in the file of this patent

UNITED STATES PATENTS

| | | |
|---|---|---|
| 2,091,519 | Noyer | Aug. 31, 1937 |
| 2,223,690 | Linde | Dec. 3, 1940 |
| 2,316,826 | Wachter | Apr. 20, 1943 |
| 2,648,452 | Gibson et al. | Aug. 11, 1953 |
| 2,767,867 | Wood | Oct. 23, 1956 |